(12) United States Patent
Vishin

(10) Patent No.: US 6,219,757 B1
(45) Date of Patent: Apr. 17, 2001

(54) CACHE FLUSH OPERATION FOR A STACK-BASED MICROPROCESSOR

(75) Inventor: Sanjay Vishin, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/032,396

(22) Filed: Feb. 27, 1998

(51) Int. Cl.⁷ .................................................... G06F 12/00
(52) U.S. Cl. ........................ 711/135; 711/132; 711/118
(58) Field of Search .................................. 711/132, 135, 711/118

(56) References Cited

U.S. PATENT DOCUMENTS 5,043,870 * 8/1991 Ditzel et al. ........................... 364/200
5,913,225 * 6/1999 Ohba et al. ............................ 711/135
5,953,741 * 9/1999 Evoy et al. ............................ 711/132

OTHER PUBLICATIONS

Jim Handy "The Cache Memory Book", p. 128, Dec. 1993.*

* cited by examiner

*Primary Examiner*—Do Hyun Yoo
*Assistant Examiner*—Kimberly McKlean
(74) *Attorney, Agent, or Firm*—Gunnison, Mckay & Hodgson, L.L.P.; Philip Mckay

(57) ABSTRACT

A method for flushing the data cache in a microprocessor. A central processing unit in the microprocessor is used to perform an operation on a first address stored in a stack cache, the address being associated with a first cache line in a data cache memory. The result of the operation is left on the top of the stack in the stack cache as a second address. A first valid bit associated with the first cache line is changed from a valid setting to an invalid setting during the same clock cycle of the microprocessor in which the operation is performed.

11 Claims, 1 Drawing Sheet

```
                              36           36
                            ⌒⌒         ⌒⌒
Initial stack state:  [top] 0x10, 0x11, 0x12, 0x13 [bottom]
Initial cache state: <address>        <data>          <valid bit>
                      ⎡ 0x20  .. .. .. .. .. .. .. ..        1 ⎤
                      ⎢ 0x18  .. .. .. .. .. .. .. ..        1 ⎥
                  30 ⎨  0x10  .. .. .. .. .. .. .. ..  32    1 ⎬ 38
                      ⎢ 0x08  .. .. .. .. .. .. .. ..        1 ⎥
                      ⎣ 0x00  .. .. .. .. .. .. .. ..        1 ⎦
                             ⌣⌣           ⌣⌣
                              42           42

Final stack state:  [top] 0x18, 0x11, 0x12, 0x13 [bottom]
Final cache state: <address>        <data>          <valid bit>
                     0x20  .. .. .. .. .. .. .. ..        1
                     0x18  .. .. .. .. .. .. .. ..        1
                     0x10  .. .. .. .. .. .. .. ..        0
                     0x08  .. .. .. .. .. .. .. ..        1
                     0x00  .. .. .. .. .. .. .. ..        1
```

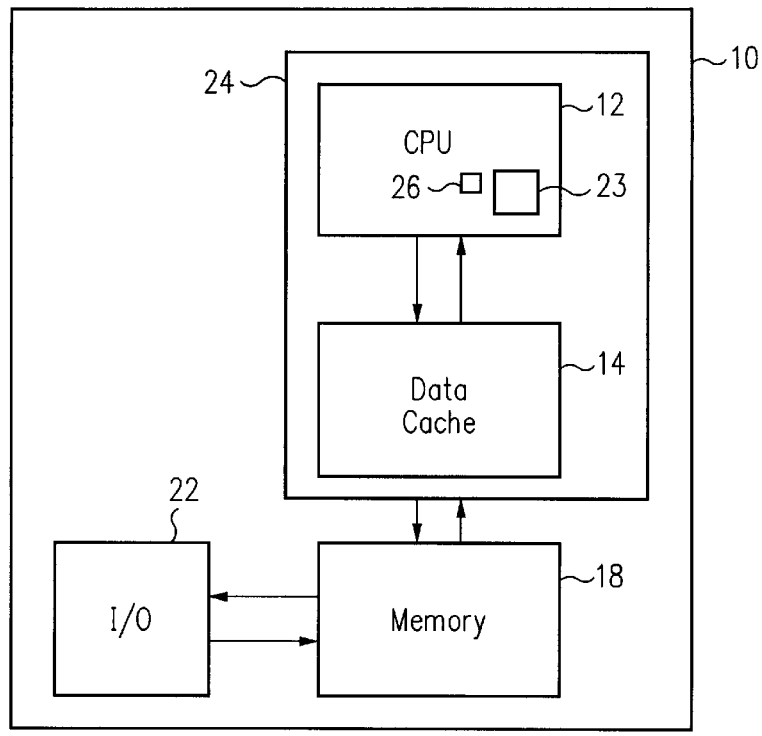
FIG. 1
(PRIOR ART)
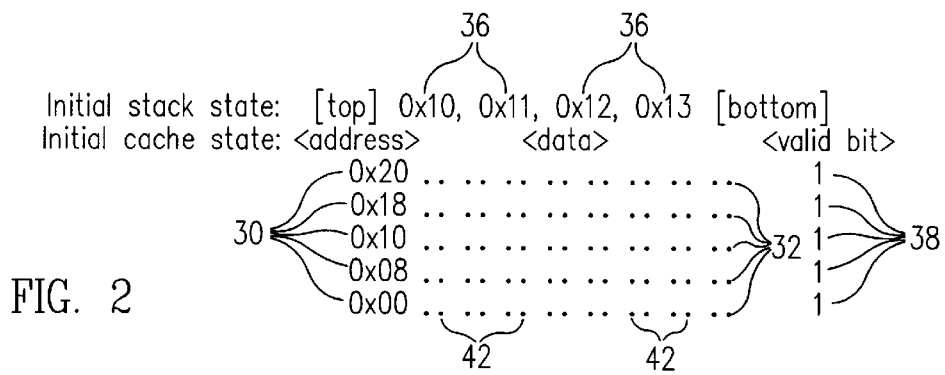
FIG. 2
```
Final stack state:  [top] 0x18, 0x11, 0x12, 0x13 [bottom]
Final cache state: <address>    <data>          <valid bit>
                    0x20 .. .. .. .. .. .. .. ..      1
                    0x18 .. .. .. .. .. .. .. ..      1
                    0x10 .. .. .. .. .. .. .. ..      0
                    0x08 .. .. .. .. .. .. .. ..      1
                    0x00 .. .. .. .. .. .. .. ..      1
```
FIG. 3
```
Final stack state:  [top] 0x20, 0x11, 0x12, 0x13 [bottom]
Final cache state: <address>    <data>          <valid bit>
                    0x20 .. .. .. .. .. .. .. ..      1
                    0x18 .. .. .. .. .. .. .. ..      0
                    0x10 .. .. .. .. .. .. .. ..      0
                    0x08 .. .. .. .. .. .. .. ..      1
                    0x00 .. .. .. .. .. .. .. ..      1
```
FIG. 4

CACHE FLUSH OPERATION FOR A STACK-BASED MICROPROCESSOR

TECHNICAL FIELD

The present invention relates to cache memory used in a computer and more particularly to a method for deleting the contents of the data cache memory in the microprocessor.

BACKGROUND ART

FIG. 1 illustrates a typical hardware configuration for a computer 10 having a central processing unit (CPU) 12, a data cache memory unit 14, regular memory 18 and an input/output device 22. The CPU 12 includes a stack cache memory unit 23. The data cache memory 14 and the stack cache 23 are typically static random access memory (SRAM), whereas the regular memory 18 is dynamic random access memory (DRAM). The input/output device 22 can be any type of peripheral attached to a computer which generates or uses data, such as a data storage device or a network interface. The CPU 12, stack cache 23 and data cache 14 are generally part of a microprocessor 24. Generally, the CPU 12 includes a stack pointer 26.

Data, computer programs (applications) and/or parts of programs running on the computer 10 are stored in the regular memory 18 and in the data cache memory 14. Typically, information travels between the data cache memory 14 and the CPU 12 much faster than it travels between the regular memory 18 and the microprocessor 24. For example, information may travel between the data cache memory 14 and the CPU 12 in ten nanoseconds, whereas the same transaction between the regular memory 18 and the microprocessor 24 would take one hundred nanoseconds. Therefore, frequently used information is stored in the data cache memory 14 so that it can be accessed faster by the CPU 12.

Periodically, information stored in the data cache 14 has to be deleted. The process of deleting information from the data cache 14 is referred to as a cache flush operation. For example, a cache flush is necessary when it is desired to ensure that the same information is contained in the data cache memory 14 as in the regular memory 18. If the microprocessor 24 is a RISC based microprocessor, the cache flush operation can specify the address of each cache line and cause information at each cache line address to be deleted. However, with stack based microprocessors (e.g. a JAVA™ microprocessor), cost sensitivity makes it undesirable to specify the address of each cache line. Moreover, with stack based microprocessors, the bytecodes for the cache flush operation have to be small (about two bytes). Therefore, a simplified cache flush procedure is needed for use with stack based microprocessors.

SUMMARY OF THE PRESENT INVENTION

Briefly, the present invention comprises a method for flushing the data cache in a microprocessor. A central processing unit in the microprocessor performs an operation (e.g. addition or subtraction) on a first address stored in a stack cache. The first address is associated with a first cache line in the data cache memory.

After the operation, the result of the operation is left on the top of the stack in the stack cache as a second address. During the same clock cycle of the microprocessor in which the operation is performed, a valid bit associated with the first cache line is changed from a valid setting to an invalid setting. The entire data cache is flushed by repeating this process for each cache line.

BRIEF DESCRIPTION OF THE DRAWINGS

FIG. 1 is a block diagram of a computer known in the prior art;

FIG. 2 is a chart illustrating the initial states of a stack cache and a data cache;

FIG. 3 is a chart illustrating the states of a stack cache and a data cache after one cache flush operation; and FIG. 4 is a chart illustrating the states of a stack cache and a data cache after two cache flush operations.

DETAILED DESCRIPTION OF THE PREFERRED EMBODIMENT

FIG. 2 illustrates the type of information associated with the cache memory in a computer that utilizes a stack-based microprocessor architecture. A plurality of addresses 30 identify the location of a plurality of cache lines 32 in the data cache 14. One of the addresses 30 is uniquely associated with each cache line 32. In the preferred embodiment, the addresses 30 and data, such as a numeric data, are stored in the data cache 14. The stack cache 23 is used to process the addresses for cache lines 32. For example, in FIG. 2, a plurality of addresses 36 represent the addresses stored in the stack cache 23.

For purposes of illustrating the present invention, it is assumed that the cache lines comprise eight bytes of data and that there is one byte per word. In FIG. 2, each set of two 32 dots represents one byte. It should be understood that there could be a different number of words per cache line and/or a different number of bytes per word. For example, a preferred embodiment of the present invention uses sixteen bytes per cache line and four bytes per word. In another embodiment, it may be desirable to use thirty-two bytes per cache line and four bytes per word.

Each cache line 32 also includes a valid bit 38. For purposes of illustration, several of the individual data bytes are represented by the numeral 42. In discussing cache memory, several terms of art are used. The term "top of stack" refers to the top data item of the stack cache which the CPU 12 is supposed to operate on next. The term "stack pointer" means a register in the CPU 12 that indicates the address of the current top of stack. The stack pointer 26 is illustrated in FIG. 1.

Returning to the example of eight bytes per cache line and one byte per word, when the cache flush operation of the present invention is initiated, the microprocessor 12 adds eight bytes to the initial address indicated by the stack pointer. The sum of this operation is referred to as the first new address. Since each of the cache lines 32 are eight bytes long, adding eight bytes to the top of stack address yields the address of the cache line adjacent to the initial top of stack cache line. In other words, the first new address is the address of the cache line adjacent to the initial top of stack cache line. The first new address is left on the top of the stack, meaning that after the first cache flush operation, the stack pointer location contains the first new address. In general, the cache flush operation of the present invention involves adding the number of bytes in the cache line to the current top of stack address. As discussed previously, this could be any number of bytes such as one, sixteen or thirty-two. During the same clock cycle that this addition process is occurring in the microprocessor, the valid bit 38 associated with the cache line 0×10 is changed from "1" to "0", indicating a change from valid to invalid. When the invalid bit "0" is associated with a cache line, that cache line will not be read by the microprocessor 12. FIG. 3 illustrates the outcome of this process by showing that the valid bit associated with the cache line 0×10 is changed from "1" to "0", and the new top of stack address is the line 0×18. Note that in FIGS. 2–3, the addresses are written in hexadecimal.

Thus, the method of cache flushing of the present invention comprises the three steps listed below. These steps occur nearly simultaneously meaning that they occur within the same clock cycle of the microprocessor 24.

1. The number of bytes in a cache line (eight bytes in this example) are added to the top of stack address to yield the first new address;
2. The first new address is placed on the top of the stack; and
3. The valid bit associated with the initial top of stack cache line is changed from valid to invalid.

In order to achieve a complete cache flush, this process continues to repeat itself until the valid bit associated with each of the cache lines 32 has been changed from valid to invalid. Note that the entire cache flush operation can be completed in a loop because the addition process always yields the address of the next cache line. Hence, after step 3 above has been completed, the stack pointer contains the first new address (i.e. cache line 0×18). Therefore, during a second cycle of the cache flush operation, the first new address is in the top of stack location. Eight bytes are added to the first new address to yield a second new address (i.e. cache line 0×20). The second new address is stored in the stack pointer and the valid bit associated with the first new address is changed from valid to invalid. FIG. 4 illustrates this process by showing that the valid bit associated with the address 0×18 has changed from 1 to 0 and the new top of stack address is 0×20. This cycle is repeated until all cache lines (five in this example) have been flushed (i.e. the valid bit has been set to invalid).

It should be noted that operations besides addition could also be used in the present invention. For example, in the example given above, instead of adding the number of bytes per cache line (i.e. eight bytes) to the top of stack address, the first new address could be generated by subtracting the number of bytes per cache line (i.e. eight bytes) from the top of stack. This would yield the address of the cache line below the current top of stack address. Also, it should be noted that the present invention can be used to flush a region of the data cache by specifying the number of lines to be flushed. Alternatively, the entire cache can be flushed. In the preferred embodiment, the microprocessor 24 is a JAVA™ virtual machine microprocessor.

The examples given below illustrate source code that is used to implement several embodiments of the present invention.

EXAMPLE 1

A flush sequence to invalidate the entire cache is:
push 8
push addr
for () {
  cache_flush;
}

EXAMPLE 2

A cache flush instruction for incrementing in an immediate field is given by:
push <0xstart_address> on stack
JT: cache_flush <0xincrement_value>
  if_gt <0xJT>

EXAMPLE 3

A cache flush instruction for incrementing in a control register is given by:
push <0xstart_address> on stack
store <0xincrement_value> in a control register
JT: cache_flush
  if_gt <0xJT>

EXAMPLE 4

A cache flush instruction for incrementing on top-1 of the stack is given by:
push <0xstart_address> on stack
push <0xincrement_value> on stack
JT: cache_flush
  if_gt <0xJT>

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for flushing a data cache memory comprising:
providing a processor, said processor including a central processing unit with a stack cache, said stack cache having a stack including a top of the stack position;
providing a data cache memory having a plurality of cache lines, each cache line of said plurality of cache lines having a length of a predetermined number of bytes;
using said central processing unit in said microprocessor to add said predetermined number of bytes to a first address stored in said stack cache, the address being associated with a first cache line in said data cache memory;
leaving the result of said addition on the top of the stack in the stack cache as a second address; and
changing a first valid bit associated with the first cache line from a valid setting to an invalid setting during the same clock cycle of the microprocessor in which the addition is performed.

2. The method of claim 1 wherein the data cache memory comprises static random access memory.

3. The method of claim 1 wherein the stack cache comprises static random access memory.

4. The method of claim 1 wherein the valid bit is represented as "1" and the invalid bit is represented as "0".

5. The method of claim 1 wherein the microprocessor comprises a Java virtual machine microprocessor.

6. The method of claim 1 further comprising:
after the first valid bit is changed to the invalid setting, using the central processing unit to perform the operation on the second address stored on the top of the stack, the second address being associated with a second cache line in the data cache memory;
leaving the result of the operation on the top of the stack in the stack cache as a third address; and
changing a second valid bit associated with the second cache line from a valid setting to an invalid setting during the same clock cycle of the microprocessor in which the operation is performed on the second address.

7. A microprocessor comprising:

a central processing unit;

a stack cache which is part of the central processing unit, said stack cache having a stack including a top of the stack position;

a data cache for storing data used by the central processing unit, said data cache having a plurality of cache lines, each cache line of said plurality of cache lines having a length of a predetermined number of bytes; and cache flush means for flushing the data cache, the cache flush means using the central processing unit in said microprocessor to add said predetermined number of bytes to a first address stored in said stack cache, the address being associated with a first cache line in said data cache, during a clock cycle of the microprocessor and wherein the cache flush means changes a first valid bit associated with a first cache line from a valid setting to an invalid setting during the same clock cycle in which the addition is performed.

8. The microprocessor of claim 7 wherein the data cache memory comprises static random access memory.

9. The microprocessor of claim 7 wherein the stack cache comprises static random access memory.

10. A method for flushing a data cache memory comprising:

providing a processor, said processor including a central processing unit with a stack cache, said stack cache having a stack including a top of the stack position;

providing a data cache memory having a plurality of cache lines, each cache line of said plurality of cache lines having a length of a predetermined number of bytes;

using said central processing unit in said microprocessor to subtract said predetermined number of bytes from a first address stored in said stack cache, the address being associated with a first cache line in said data cache memory;

leaving the result of said subtraction on the top of the stack in the stack cache as a second address; and changing a first valid bit associated with the first cache line from a valid setting to an invalid setting during the same clock cycle of the microprocessor in which the subtraction is performed.

11. A microprocessor comprising:

a central processing unit;

a stack cache which is part of the central processing unit, said stack cache having a stack including a top of the stack position;

a data cache for storing data used by the central processing unit, said data cache having a plurality of cache lines, each cache line of said plurality of cache lines having a length of a predetermined number of bytes; and cache flush means for flushing the data cache, the cache flush means using the central processing unit in said microprocessor to subtract said predetermined number of bytes from a first address stored in said stack cache, the address being associated with a first cache line in said data cache, during a clock cycle of the microprocessor and wherein the cache flush means changes a first valid bit associated with a first cache line from a valid setting to an invalid setting during the same clock cycle in which the subtraction is performed.

* * * * *